UNITED STATES PATENT OFFICE.

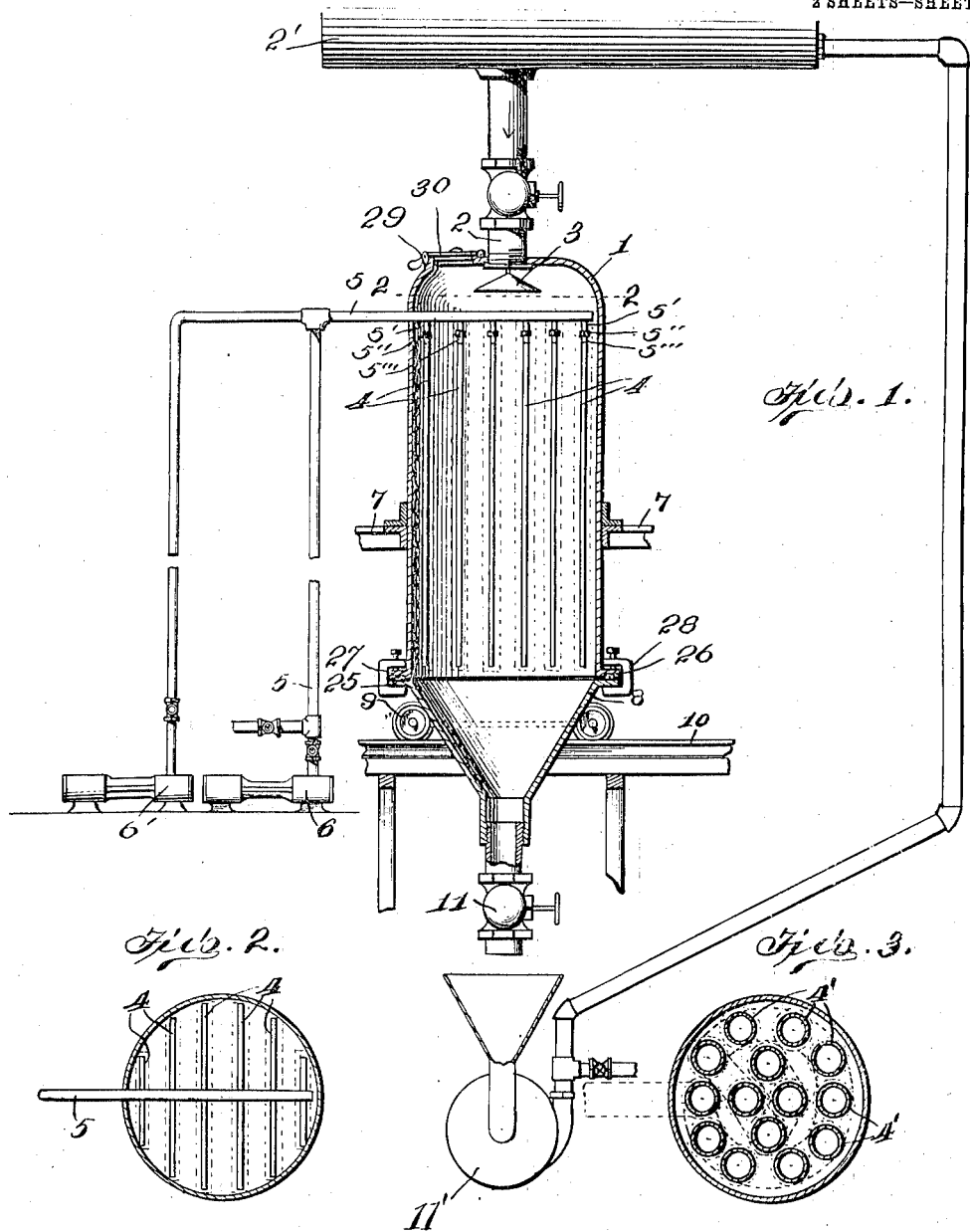

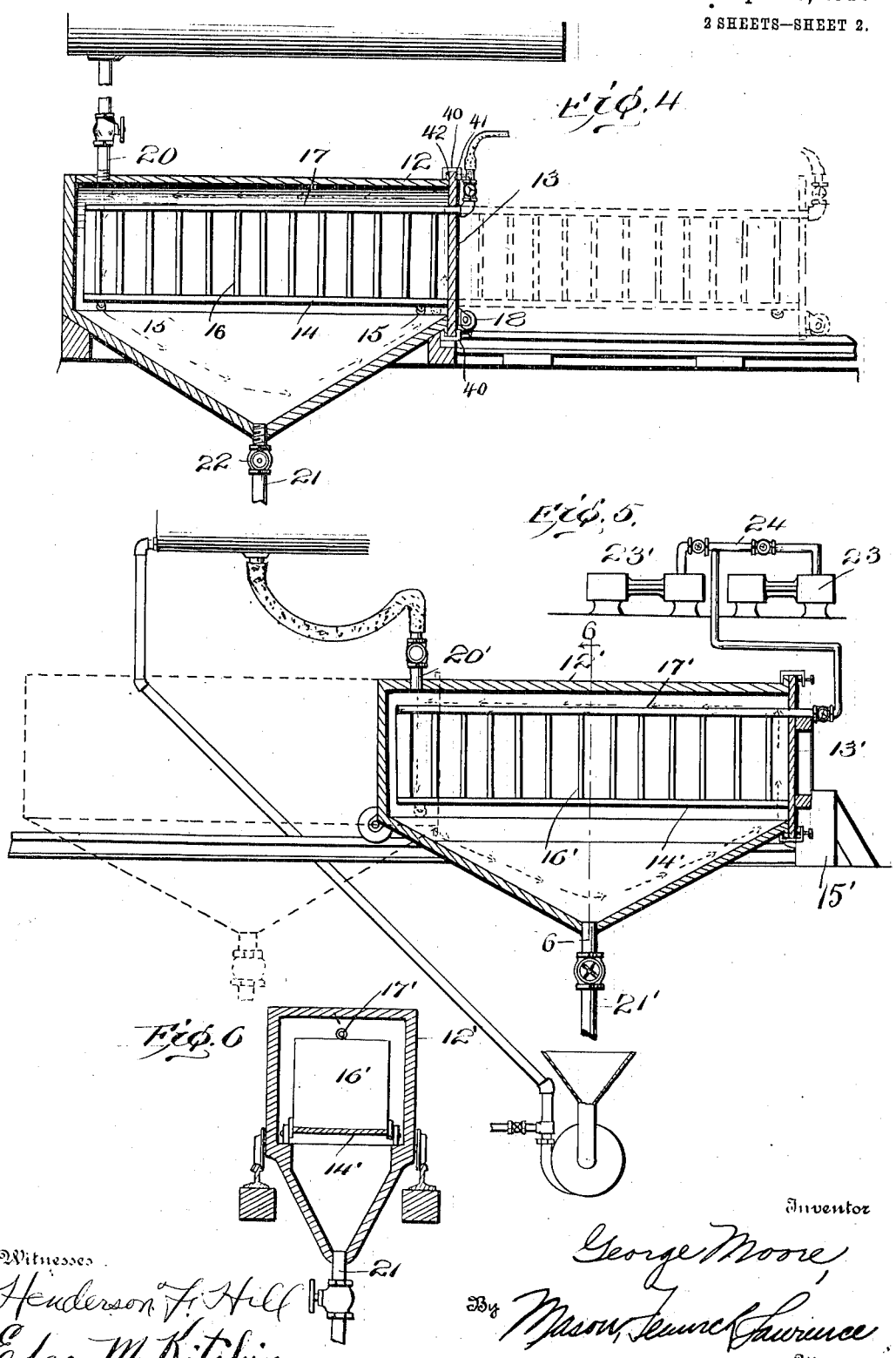

GEORGE MOORE, OF SALT LAKE CITY, UTAH.

FILTER.

955,660.  Specification of Letters Patent.  Patented Apr. 19, 1910.

Application filed February 20, 1904. Serial No. 194,585.

*To all whom it may concern:*

Be it known that I, GEORGE MOORE, a citizen of the United States, residing at Salt Lake City, in the county of Salt Lake and State of Utah, have invented certain new and useful Improvements in Filters; and I do hereby declare the following to be a full, clear, and exact description of the invention, such as will enable others skilled in the art to which it appertains to make and use the same.

My invention relates to improvements in filtering apparatus, and particularly to the type now commonly known as the Moore filter which is the subject of my Patent No. 748,088, dated Dec. 29, 1903.

In the accompanying drawing: Figure 1 represents a longitudinal, vertical, central section through a filter embodying the features of the present invention. Fig. 2 represents a transverse, sectional view of the same, taken on the plane of line 2, 2 of Fig. 1. Fig. 3. represents a similar view of a modified form of the same. Fig. 4 represents a longitudinal, vertical, central section through a filter embodying a further modification. Fig. 5 represents a similar view of another modified form of filter. Fig. 6. represents a transverse, vertical section taken on the plane of line 6, 6 of Fig. 5.

The following is a description of the filters illustrated in the accompanying drawings which show my invention embodied in forms which are at present preferred by me, but it will be understood that various modifications and changes may be made without departing from the spirit of my invention and without exceeding the scope of my claims.

Referring to the drawing by numerals, 1 indicates a pressure chamber which is provided, at its upper end, with a supply pipe 2 having a suitable spreader 3 positioned beneath the discharge end of said pipe. Suitably supported within the chamber 1 are filtering plates or cells 4, 4 spaced apart and arranged to cover as great an area within said chamber as practicable. Each of the plates or cells 4 may be made up in any preferred manner so as to present a filtering surface with an interior space communicating with a common discharge tube 5, which in turn communicates with any suitable pump 6 designed for effecting a drawing action through said tube during a part of the operation, and with pump 6' for passing a reverse current through said filter during the discharge of the solids collected thereon, as will hereinafter fully appear. The chamber 1 is mounted upon any suitable, fixed brackets 7, 7 and retained by the same in a given position. A preferably funnel shaped head 8, having an annular, outwardly extending flange 25, normally closes the lower end of the chamber 1, said chamber 1 being formed, at its lower end, with a similar flange 26, and said head rests upon any suitable carriage 9 positioned to travel upon tracks 10, said head being arranged to slide beneath the lower end of said chamber 1 and being free to move from beneath the same whenever desired. A suitable, annular packing or gasket 27 is preferably carried by the flange 26, and said flanges 25 and 26 are adapted, when the parts are in the position indicated in Fig. 1, to be locked together by means of the clamps 28. The lower end of the tapered or funnel shaped head 8 is provided with any suitable controlling valve 11 for preventing the discharge of the materials within the chamber when desired.

As will be observed by reference to Fig. 3, the plates 4 may be substituted by tubular filters 4' in any suitable number and arranged for facilitating the drawing of material through the filtering medium carried by said tubes.

The following is a description of the preferred manner of using said filter in the filtration of metal bearing pulps.

In operation, the metal bearing pulps are introduced under pressure through the pipe 2 from pressure tank 2' into the chamber 1, such pressure being sufficient for forcing the liquids from said pulps through filter plates 4 or tubes 4', until the said plates or tubes, as the case may be, become coated with solids, as indicated in dotted lines in the drawing, said coating never being permitted to become thick enough to entirely close the spaces between the several plates, or between the plates or tubes and the contiguous walls of chamber 1. At this point, the surplus pulp is allowed to flow out through valve 11, the vacuum pump being brought into operation for holding the slime cakes in position on the filter surfaces, and a dissolving fluid is introduced through the pipe 2, followed by a cleansing fluid, as water, and the vacuum pump 6 continues its operation until the desired amount of such fluids is drawn through the solids and the filtering medium, and out through pipe 5, the said fluids being introduced under such head of pressure if desired as to be forced through the filters independently of action of pump 6. This operation may be continued with either or both of said fluids until the solids being treated have been impoverished to the desired degree, the valve 11 being opened for permitting the excess liquids within the chamber 1 to escape at the close of each operation, and said valve being closed for the next operation. The drawing action through pipe 5 is continued during the escape of the liquid through the valve 11 and also while head 8 is being moved along the track 10. As soon as head 8 has been removed from beneath chamber 1, the pumping action is stopped, and air is permitted to enter the filter plates 4 through the pipe 5 either under pressure or not, as may be desired. If desired air is introduced under pressure from pump 6', and the solids will fall from the filtering medium into any suitable receptacle below. However, it is not absolutely necessary that the air introduced should be under pressure, for the reason that the weight of the solids clinging to the filtering medium is usually sufficient to cause such solids to drop from the filters when released by the admission of atmosphere, and the consequent release of vacuum within the filters. After the solids have been discharged, the head is returned to its former position, and the operation may be repeated. By this structure I am enabled to remove all, or substantially all of, the precious metals from slimes in the most expeditious manner while facilitating the disposition of the solids after their cleansing.

During the operation, as above set forth, it is found that, unless some means are provided to prevent clogging of the heavier substances within the bottom head 8, the settling of sands during one operation will be sufficient for filling such bottom and closing up the spaces between the plates 4 at their lower ends, and, in order to prevent such clogging, I contemplate leaving the valve 11 slightly open during the building up of the cakes or coatings of solids on the filter plates, not, however, to a sufficient extent for relieving the pressure within the chamber 1, whereby the settled portions of solids will be removed as the same descend into the bottom 8. Of course, the portions that are discharged in this manner through valve 11 may be returned to the original source of supply for further treatment. That is to say, the discharged slimes may be directed back to chamber 1 by any suitable conveyer, as by a return pipe extending from below the valve 11 up to the supply tank 2' provided with any suitable apparatus, as the pump 11', for lifting the slimes through the pipe. The dissolving and cleansing fluids drained through valve 11 may, of course be disposed of in any suitable or preferred manner, as by being passed through a suitable branch or branches of said return pipe.

From the foregoing and from the disclosure in the drawing, it will be observed that the movement of the liquids into the interior of the filter plates occurs as a result of a difference in pressure between the exterior and interior of the filter plates, and this difference in pressure may be created and maintained as specified by the supply of the material to be filtered under pressure through the pipe 2 or by any other suitable method as desired.

Regardless of how the difference in pressure which produces the filtration is maintained, it is to be noted that the influx of material through pipe 2 (which is permitted by the maintenance of the valve 11 in a partially open condition, and by the discharge through pipe 5,) and its discharge over the spreader 3 creates movement which prevents stratifying of the solids and insures substantially uniform consistency of the body of the pulp. Thus the coatings on the several filter plates 4 will be built up of substantially uniform resistance to the action resulting from the difference in pressure between the interior and exterior of the filter plates. It is to be noted, of course that the dissolving fluid is introduced after the removal of the free pulp, and the washing fluid is introduced after the removal of the free dissolving fluid.

In order to facilitate the removal of plates 4 from within the chamber 1, I preferably connect said plates with the pipe 5 by means of nipples 5', 5' and unions 5'' connecting said nipples with pipes 5''' engaging the plates 4. An entrance opening 29 is preferably formed in the upper end of the chamber 1 and normally closed by a suitable cap 30. Thus it will be seen that, when the plates 4 become worn or broken or, for any other reason, it becomes desirable to remove the same, it is only necessary to rotate the unions 5'' sufficiently for unscrewing their connections with pipes 5''', and said plates are free to be removed.

If in practicing the present invention with heavier pulp or slimes it is found that the degree of movement of the pulp in the chamber 1 is not as high as may be desired, an increased amount of movement may be secured by the employment of a slightly modified form of apparatus, such as is illustrated in Fig. 4, in which 12 is a filtering chamber adapted to be supplied with pulp to be filtered by a valved pipe 20 extending from a supply tank, the pulp delivered through the pipe 20 being supplied under pressure. The bottom of the chamber 12 is conical or tapering to a suitably valved discharge tube 21, the valve being adapted to be arranged as at 22. The supply pipe 20 is arranged at one end or side of the chamber 12 so that the incoming pulp will produce a circulatory movement of the contents of the chamber somewhat after the manner indicated by the arrows, owing to the entrance of pulp at one side of the circulating mass. A removable head 13 is provided for the chamber 12, and during operation is clamped in position by any suitable clamps 40 applied to the flanges 41 and 42 of the head 13 and open end of the chamber 12 respectively. The head 13 is supported by carrying wheels 18 running on tracks 18', which extend forwardly from and parallel to the longitudinal axis of the chamber 12. Fixed to the head 13, and in operation extending within the chamber 12 is a filter frame 14 supporting a number of filter plates 16 constructed similarly to plates 4. Obviously tubular filter cells, such as are seen at 4' may be utilized instead of the plates 16. The frame 14 is mounted on carrying rollers 15 arranged on tracks or ways within the chamber 12 parallel to the longitudinal axis thereof, and each of the filter plates 16 communicates with a common discharge pipe 17 which pipe is connected by a flexible pipe with any suitable vacuum and blast pumps, not illustrated, similar to pumps 6 and 6' respectively.

The operation is carried out in conjunction with the chamber 12 and connected parts exactly as described above, the disposition of the solid coatings from the filter cells being accomplished in a slightly different manner, that is by withdrawing the cells from the inclosing chamber after a complete filtering operation and discharging the solids instead of withdrawing the bottom of the chamber. The preferred form of operation while using the chamber 12 and surrounding parts consists in the introduction of the pulp into the chamber while the filter frame and filter plates are disposed therein and the head 18 is clamped in position, the pulp being supplied under sufficient pressure for forcing the liquid through the filtering medium and out through a common discharge pipe 47, until cakes or coatings of requisite character are built up on the filter cells, the building up being approximately uniform owing to the movement occurring within the chamber 12 due to the influx of pulp and discharge of liquid. Of course, some of the heavier solids will settle down into the pipe 21, and as the valve in said pipe is left slightly open (not, however, to an extent sufficient for relieving the pressure in the chamber 12), the settlings will descend into a return pump or other suitable conveying apparatus and be returned thereby through a pipe or like medium to the original source of supply, that is, to the supply tank after the manner suggested by the return pipe in Fig. 1. The branch pipe and the main portion of the return pipe may, of course be suitably valved for controlling the return as desired.

After the cakes on the filter plates 16 have been built up to the extent desired, the supply of pulp through pipe 20 is cut off, and the valve in the pipe 21 is opened for draining the free pulp from the chamber 12, the vacuum pump which communicates with pipe 17 operating during this draining to prevent dropping of the cakes of solids from the filter plates 16, and the said vacuum pump continues its operation after the valve in pipe 21 has been closed and while a dissolving fluid is being introduced through the pipe 20, as for instance from a branch pipe, not illustrated, leading from any suitable source of supply. After the dissolving fluid has been introduced and the requisite quantity thereof passed through the cakes of solids on the filter plates for removing the remaining values therefrom, (the passage of the dissolving fluid through such cakes being in the nature of a uniform advance through the cakes owing to the evenness of resistance to such advance by reason of the form in which the cakes have been built up,) the chamber 12 is drained of the free dissolving fluid through the pipe 21, which fluid may be returned to its source of supply by the return pump through the return pipe after the manner indicated in the return pipe shown in Fig. 1.

Of course, during the draining of the dissolving fluid from the chamber 12, the vacuum pump continues its operation, having been employed if desired for aiding in the maintenance of the difference in pressure between the interior and exterior of the filter plates 16, it being obvious of course that the said vacuum pump may be utilized at any time for this purpose during the practicing of the present invention. As soon as the chamber 12 has been drained of the free dissolving fluid, a charge of cleansing fluid is introduced through the pipe 20, as for instance, from a suitably valved branch of said pipe, not illustrated, and the cleansing fluid is then passed through the cakes of solids on the filter plates 16 in exactly the same manner as described with respect to the dissolving fluid, the cleansing fluid taking the place of the dissolving fluid in the solids as did the dissolving fluid take the place of the metal bearing liquid in the solids. After the solids have been thoroughly washed and all of the dissolving fluid removed by the penetration of the solids by the cleansing fluid, the supply of cleansing fluid is cut off and the free fluid is drained through pipe 21 and returned by the return pump to the original source of supply of such cleansing fluid, as by means of a suitably valved branch of the return pipe, the vacuum pump being operated during the cleansing operation for aiding in the maintenance of the difference in pressure between the interior and exterior of the filter plates, and continuing its operation as the chamber 12 is drained of the free cleansing fluid for retaining the cakes of solids on the filter plates. The vacuum pump continues its operation while the clamps 40 are removed and the frame 14 moved outwardly to the position indicated in dotted lines, whereupon air is admitted through the pipe 17 and connections to the interior of the filter plates. Ordinarily the weight of the cakes of solids on the filter plates is sufficient for causing them to drop from the plates, but when desired a reverse, cleansing current may be passed through the pipe 47 and connections to the interior of the filter plates and outwardly through the filtering medium thereof for dislodging the cakes by the operation of the blast pump. The frame 14 may then be returned to the interior of chamber 12, and the operation repeated.

In Fig. 5 I have illustrated a structure quite similar to that disclosed in Fig. 4, with the exception that the chamber 12', is mounted to move toward and away from its head 13', instead of the movement of the head of the device shown in Fig. 4. The head 13' is fixed upon any suitable support 15' and connected to a frame 14' carrying filtering sections 16' communicating with a common discharge tube 17', which in turn is connected to a suction pump 23 and to a blowing pump 23' by a suitable, connecting, branched pipe 24, the operation of said pumps being controlled by valves in the branches of said pipe 24. A metal bearing solution supply pipe 20' communicates with the chamber 12', and said chamber is provided with a drain 21' similar to the structure shown in Fig. 4.

The operation of the elements illustrated in Fig. 5 is precisely similar to that of the structure disclosed in Fig. 4, except that the chamber 12' is moved away from the filter sections instead of having the filter sections moved from the chamber.

The process of filtering disclosed herein is not here made the subject of claim, as the same is fully claimed in my divisional application filed Jan. 17, 1908, and designated by Serial No. 411,286. The specific features of the invention involving a stationary tank and stationary filters therein is also made the subject-matter of my divisional application filed Jan. 17, 1908, and designated by Serial No. 411,288. The specific combination of the stationary tank with removable filters is also made the subject-matter of my divisional application filed Jan. 17, 1908, and designated by Serial No. 411,287. This application is thus directed to the genus of the invention and to that species embodying the stationary filters and the removable container or tank therefor.

It is to be observed that the discharge of filtered liquid through the pipe 5 and the drain of pulp through the valve 11 accompanied by the constant influx of pulp through pipe 2 under pressure will maintain such a continuous movement of the pulp within the chamber 1 as will prevent any large amount of settling or stratification of the body of the pulp. For example, in a structure such as seen in Fig. 4, the incoming pulp enters at one side of the mass of pulp in the chamber, and the natural result will be a descent of the incoming pulp, then a lateral movement thereof, and finally an upward movement at the opposite end of the chamber from the point of intake, as indicated by the arrows. This circulation and movement performs the obvious and very valuable function of maintaining the light particles of solids of which the body of the pulp is composed in a state of substantially uniform suspension, so that the cakes of solids built up on the filter surfaces will assume a form which will offer a substantially uniform resistance to the passage of fluid through the cakes and filtering medium, and will thus cause a substantially uniform advance of the inflowing fluid throughout all parts of the cakes.

It is to be noted that during the operation of filtration the pulp which passes down through the filtering chamber while moving past the filter cells will deliver to the surface of the cells certain portions of the solids constituting the body of the pulp, and it is obvious that if certain areas of the pulp contain lighter or a relatively less amount of solids than other areas of the pulp within the chamber, the liquid will flow more readily from such lighter areas of the pulp through the walls of the filters, and thus build up more rapidly of the solids on the filter cells at the points contiguous such lighter portions of pulp than at other points of the filter cells, so that the sluggish movement of the heavier solids and rapid movement of the more flocculent solids will insure a building of a cake on each of the filter cells having a substantially even resistance to the inflow therethrough of the displacing or washing solutions.

Having thus fully described my invention, what I claim as new and desire to secure by Letters Patent is:

1. In a filter, the combination with a chamber adapted to contain pulp, of a plurality of filtering mediums in said chamber with spaces between them, said spaces being in open communication with each other, means above the filtering mediums for supplying pulp to the chamber, means for maintaining a difference in pressure between the side of the filtering mediums exposed to the pulp and the opposite side thereof, for causing liquid from the pulp to pass through each of the filtering mediums and build a cake of solids on each of said mediums, means for moving pulp past said cakes during the building of the cakes, means for draining off the free pulp from the chamber after the building up of such cakes, and means for maintaining the said difference in pressure for passing displacing fluid through said cakes and filtering mediums.

2. In a filter, the combination with a chamber adapted to contain pulp, of a plurality of stationary filtering mediums in said chamber with spaces between them, said spaces being in open communication with each other, means above the filtering mediums for supplying pulp to the chamber, means for maintaining a difference in pressure between the side of the filtering mediums exposed to the pulp and the opposite side thereof, for causing liquid from the pulp to pass through each of the filtering mediums and build a cake of solids on each of said mediums, means for moving pulp past said cakes during the building of the cakes, means for draining off the free pulp from the chamber after the building up of such cakes, and means for maintaining the said difference in pressure for passing displacing fluid through said cakes and filtering mediums.

3. In a filter, the combination of fixed filtering medium, of a chamber movable with respect thereto and adapted at times to be shifted for exposing the filtering medium for permitting cleaning thereof, the chamber being adapted normally to inclose the filtering medium, and being also adapted to contain material to be filtered, means for maintaining a difference in pressure between the side of the filtering medium exposed to the material being filtered and the opposite side thereof for causing liquid to pass from said material through said medium and build a cake of solids on said medium, means for draining free material from the chamber, means for supplying a displacing fluid to the chamber, and means for continuing the maintenance of the difference in pressure during the draining of material from the chamber and subsequent supplying of the displacing fluid and thereafter for passing the displacing fluid through the cake of solids and the filtering medium.

4. In a filter, the combination with a chamber adapted to contain pulp, of filtering medium in said chamber, means for causing movement of pulp within said chamber, means for maintaining a difference in pressure between the side of the medium exposed to the pulp and the opposite side of such medium, for causing liquid from the pulp to pass through the filtering medium and build a cake of solids on said medium, means for draining off the free pulp from the chamber after the building up of such cake, and means for maintaining said difference in pressure during and subsequent to the discharge of the free pulp for sustaining said cake in position on the filtering medium and for passing a displacing fluid through said cake without altering the relative positions of the chamber and medium.

5. In a filter, the combination with a chamber and a filtering medium therein disposed substantially vertically, means for introducing material to be filtered into contact with the filtering medium under pressure, for causing liquid from such material to pass through the filtering medium, and means for retaining the solids from such material collected upon said filtering medium thereon subsequent to relief of such pressure for further treatment of such solids.

6. In a filter, the combination with filtering medium, of means for passing liquid from pulp through said medium by pressure exerted directly upon the pulp, and means for subsequently creating a vacuum at that side of the filtering medium not contacting with the pulp.

7. In a filter, the combination with a filtering medium, of means for exposing one side of the filtering medium to pulp, means for subjecting the pulp to direct pressure for passing liquid from the pulp through the filtering medium and leaving a cake of solids on the medium, means for submerging the medium with its cake of solids in a displacing bath, and means for creating a vacuum at that side of the medium not previously exposed to the pulp for passing a current from the bath through the cake and medium.

8. In a filter, the combination with a chamber adapted to contain pulp, of a plurality of filtering mediums in said chamber with spaces between them, said spaces being in open communication with each other, means for supplying pulp to the chamber, means for causing a movement of the pulp within said chamber, means for maintaining a difference in pressure between the side of the filtering mediums exposed to the pulp and the opposite side thereof, for causing liquid from the pulp to pass through each of the filtering mediums and build a cake of solids on each of said mediums, means for draining off the free pulp from the chamber after the building up of such cake, and means for maintaining the said difference in pressure for passing displacing fluid through said cake and filtering medium.

9. In a filter, a movable tank with an open end, a fixed head for closing said end, with locking means for securing the closure, filter frames fixed in position to be inclosed by said movable tank and fixed head, a supply tank containing fluid with a controllable outlet discharging therefrom into said movable tank, a discharge pipe in said movable tank and a suction apparatus connected with the filter frames.

10. In a filter, a series of fixed filter frames with fixed inlet and outlet pipe connections, a suction pump connected to said connections, a movable tank inclosing said filter frames, means for filling said tank, a receptacle for the contents of said tank, and means for causing movement of the pulp within said tank.

11. In a filter, the combination with a chamber, and means for supplying thereto under pressure material to be filtered, of a tapering bottom for said chamber, a filtering medium within the chamber, means for drawing the liquid from the material within the chamber, through said filtering medium, and a drain at the apex of said bottom.

12. In a filter, the combination with a chamber, of means for supplying material thereto under pressure, of a filtering medium arranged within said chamber, a bottom for the chamber, one of the two last-recited elements being movable with respect to the other, a discharge opening being formed in said bottom, and means for drawing liquid from said chamber through said filtering medium.

13. In suction filters, a stationary filter frame, with fixed inlet and outlet pipe connections thereto, and a movable tank inclosing said filter frame but removable therefrom at will, substantially as described.

14. In a filter, the combination with a chamber, of a filtering medium within the same, a tube communicating with said filtering medium, means for introducing material to be filtered into said chamber under pressure, means for relieving said pressure, means for producing a drawing action upon said filtering medium for retaining the solids collected on said medium in position, and means for relieving said drawing action for releasing said solids.

15. In suction filters, fixed filter frames, with fixed pipe connections, a fixed head, a movable open-ended tank inclosing said filter frames and abutting by its open end against said fixed head, means for securing the tank end to the fixed head, means for filling said tank, and a discharge pipe for said tank, substantially as specified.

16. In a filter, the combination with a chamber and a filtering medium therein disposed for allowing solids collected thereon to drop therefrom when the solids are released, of means for introducing material to be filtered into contact with said filtering means under pressure, means for relieving such pressure, and means for retaining the solids from said material collected upon said filtering medium thereon after the relief of said pressure.

17. In a filter, the combination with a chamber and a filtering medium therein disposed for allowing solids collected thereon to drop therefrom when the solids are released, of means for introducing material to be filtered into said chamber under pressure and for maintaining such pressure until cakes of solids have been built up upon the filtering medium, means for relieving said pressure, and means for retaining said cakes in position on said medium after the relief of such pressure.

18. In a filter, the combination with a chamber and a filtering medium therein disposed for allowing solids collected thereon to drop therefrom when the solids are released, of means for introducing material under pressure into said chamber, the pressure being such as to force the liquid from such material through said medium, means facilitating the opening of said chamber, and means for retaining the solids collected on said filtering medium in position thereon when said chamber is opened.

19. In a filter, the combination with a chamber and a filtering medium within the same, of means for introducing material into contact with said filter under pressure, a discharge for said filter, means for draining the excess of liquids from said filter, and means for preventing dislocation of solids collected on said medium during such draining operation.

20. In filters, a stationary filter frame, with fixed pipe connections thereto, and a movable tank inclosing said filter frame but removable therefrom at will.

21. A filtering apparatus, comprising a tank, inclosed filtering cells, a suction pump connected thereto, a pulp distributer at the top of the tank, means for delivering material from a source of supply to the distributer, and means for delivering material from the bottom of the tank to the source of supply.

22. In a filter, the combination with a chamber, means for supplying pulp, a dissolving fluid and a cleansing fluid successively thereto, a filtering medium within the chamber, means for maintaining a difference in pressure between the surface of the filtering medium exposed to the pulp and the opposite surface thereof for passing liquid from the pulp through the filtering medium, the said difference in pressure being adapted to be maintained during successive introductions of the dissolving fluid and cleansing fluid, and a drain for the chamber adapted to be successively opened and closed at the conclusion of each operation upon the pulp, dissolving fluid and cleansing fluid respectively.

23. In a filter, the combination with a chamber, and filtering medium therein, of means for successively submerging said filtering medium in pulp and in a displacing fluid, and for maintaining a difference in pressure on the side of the filtering medium exposed to the pulp from the opposite side thereof and moving the pulp, and means for continuing the maintenance of such difference in pressure while the said filtering medium is submerged in displacing fluid.

24. In a filter, the combination with a chamber and a filtering medium therein, of means for successively submerging the filtering medium in pulp, in a dissolving fluid and in a cleansing fluid, and for maintaining a difference in pressure on the side of the filtering medium exposed to the pulp from the opposite side thereof while moving the pulp, and means for continuing the maintenance of a difference in pressure while the medium is submerged in the dissolving fluid and in the cleansing fluid.

In testimony whereof I hereunto affix my signature, in presence of two witnesses.

GEORGE MOORE.

Witnesses:
JAMES P. HYMER,
GEORGE S. NEFF.